Patented May 6, 1947

2,420,127

UNITED STATES PATENT OFFICE 2,420,127

CORROSION PREVENTIVE COMPOSITION

George L. Doelling, St. Louis, Mo., assignor to Wagner Electric Corporation, St. Louis, Mo., a corporation of Delaware No Drawing. Application March 17, 1944, Serial No. 527,002

2 Claims. (Cl. 106—14)

My invention relates to a composition of matter and method of making the same, its object being to produce a corrosion-preventive composition for use on articles made of metal, or partly of metal and partly of rubber, one important practical application being its use in treating hydraulic brake parts before packing and shipping the same.

Generally speaking, my improved composition comprises blown castor oil, a diluent, an alkaline earth ricinoleate, and an alkali metal ricinoleate, one specific suitable composition being as follows:

| | Per cent by weight |
|---|---|
| Blown castor oil | 64 |
| Isopropanol 99% | 26 |
| Calcium ricinoleate | 4.5 |
| Sodium ricinoleate | 2.7 |
| Potassium ricinoleate | 0.8 |
| Water | 1.7 |

Blown castor oil usually contains 8 to 10% of free ricinoleic acid, the great majority of which, however, is elminated by the process of manufacture hereinafter described and the composition made in accordance with said process contains only approximately 1% or less of ricinoleic acid. The composition has the characteristic of producing a thick adherent film on the metal parts to be protected from corrosion, this characteristic being no doubt mainly attributable to the use of blown castor oil as distinguished from the ordinary castor oil of commerce. The alkaline earth ricinoleate is water repellent and the alkali metal ricinoleates have the function of maintaining the pH slightly on the alkaline side which aids in inhibiting rust. Experience has shown that my new composition is very effective in preventing corrosion on parts subjected to the high temperature and humid climate of the tropics and without causing undue swelling or other injury to rubber parts.

The method of manufacture of this composition is as follows, the quantity of materials mentioned being, of course, illustrative and for the purpose of setting forth the proportions found suitable:

A steel drum equipped with a high speed stirrer and means for heating the contents, is charged with 29.82 gallons of blown castor oil (Baker's Pale 4 oil, as an example) and 12.5 gallons of isopropanol, the charge being stirred preferably at a temperature of about 30° C. to secure a uniform solution. In a separate vessel 1.6 gallons of isopropanol and .75 gallon of water are mixed with 974 grams of pure powdered calcium hydroxide and this slurry is added to the castor oil and isopropanol solution, the resulting mixture being stirred for approximately one hour. Following this, 846 cc. of sodium hydroxide solution (44% NaOH by weight) is added slowly while stirring, and after this, 282 cc. of potassium hydroxide solution (50% KOH by weight) is stirred in. In the particular example described a 45 gallon quantity of the composition is produced.

This solution has a specific gravity of .9465 at 20°/20° C. and the pH of the solution determined electrometrically was 8.0. The per cent of free ricinoleic acid is usually one per cent or less.

While a larger quantity of the sodium hydroxide solution might be employed and the potassium solution omitted, and vice versa, I prefer to use both in the relative proportions indicated. The hydroxides react with the free ricinoleic acid to produce the alkaline earth ricinoleates and the alkali metal ricinoleates of the completed composition, and the desired reduction of free acid present in blown castor oil down to a non-injurious amount, is achieved. The free ricinoleic acid in a composition of this character should be less than 5%.

A corrosion-preventive composition using barium instead of calcium can be made with the following ingredients:

| | | |
|---|---|---|
| Blown castor oil (1450 centistokes at 100° F.) | grams | 200 |
| Isopropanol ("99%" grade) | cubic centimeters | 95 |
| Water | do | 5 |
| Barium hydroxide (anhydrous, powdered) | grams | 3.9 |
| Sodium hydroxide solution (44% NaOH by weight) | cubic centimeters | 2 |

The blown castor oil and 75 cc. of the isopropanol are introduced into a flask equipped with a stirrer. The barium hydroxide and water and 20 cc. of the isopropanol are mixed into a slurry and then added to the oil-isopropanol solution and the mixture stirred for an hour or more at about 30° C. Then the NaOH solution is added slowly with stirring.

The resultant composition has good corrosion-resistant properties, and does not have an adverse effect on the rubber parts of a brake system.

The corrosion-preventive composition of this invention can be applied to the parts to be treated by dipping, spraying, brushing, or by any convenient means. By using less diluent a composition of grease-like consistency can be made and applied in any convenient manner.

Other alkaline earth ricinoleates, such as barium, strontium and magnesium ricinoleates, may be substituted for the calcium ricinoleate. The function of the isopropanol is to act as a diluent to increase the fluidity of the oil and after application to the parts to be protected, this diluent evaporates. For isopropanol, other alcohols having not more than 3 carbon atoms per molecule, such as ethyl, methyl and normal propyl, may be substituted.

The ratio of materials can be varied considerably from the proportions given in the examples, and the amount of diluent can be adjusted to secure the viscosity desired. Being volatile, the amount of diluent is not critical. It serves simply as a means of evenly distributing the corrosion-preventive composition over the surfaces to be protected.

Having fully described my invention, what I claim as new and desire to secure by Letters Patent of the United States is:

1. A corrosion-preventive composition comprising approximately 64% by weight of blown castor oil, 26% by weight of an alcohol having not more than three carbon atoms per molecule, 4.5% by weight of an alkaline earth ricinoleate, and 3.5% in total weight of at least one alkali metal ricinoleate.

2. A composition of matter consisting approximately of 64% by weight of blown castor oil, 26% by weight of isopropanol, 4.5% by weight of calcium ricinoleate, 2.7% by weight of sodium ricinoleate, 0.8% by weight of potassium ricinoleate, and 1.7% by weight of water.

GEORGE L. DOELLING.

REFERENCES CITED

The following references are of record in the file of this patent:

UNITED STATES PATENTS

| Number | Name | Date |
|---|---|---|
| 2,329,474 | Lazar et al. | Sept. 14, 1943 |
| 2,327,450 | Parker | Aug. 24, 1943 |
| 2,283,931 | Irwin | May 26, 1942 |
| 1,932,156 | Ducamp et al. | Oct. 24, 1933 |
| 2,008,419 | Herman | July 16, 1935 |
| 1,240,566 | Harris | Sept. 18, 1917 |
| 2,359,738 | Schiermeier | Oct. 10, 1944 |

FOREIGN PATENTS

| Number | Country | Date |
|---|---|---|
| 27,135 | British | 1909 |
| 10,864 | British | 1896 |